(12) United States Patent
Harrison et al.

(10) Patent No.: US 8,819,762 B2
(45) Date of Patent: Aug. 26, 2014

(54) SYSTEM AND METHOD FOR AUDITING A SECURITY POLICY

(75) Inventors: Reuven Harrison, Tel Aviv (IL); Reuven Kitov, Tel Aviv (IL)

(73) Assignee: Tufin Software Technologies Ltd., Ramat Gan (IL)

( * ) Notice: Subject to any disclaimer, the term of this patent is extended or adjusted under 35 U.S.C. 154(b) by 1530 days.

(21) Appl. No.: 11/988,831

(22) PCT Filed: Dec. 6, 2007

(86) PCT No.: PCT/IL2007/001511
§ 371 (c)(1),
(2), (4) Date: Jan. 15, 2008

(87) PCT Pub. No.: WO2008/093320
PCT Pub. Date: Aug. 7, 2008

(65) Prior Publication Data
US 2009/0138938 A1    May 28, 2009

Related U.S. Application Data

(60) Provisional application No. 60/887,369, filed on Jan. 31, 2007.

(51) Int. Cl.
*G06F 21/00* (2013.01)
*G06F 21/60* (2013.01)
*H04L 29/06* (2006.01)

(52) U.S. Cl.
CPC .............. *G06F 21/604* (2013.01); *H04L 63/20* (2013.01); *H04L 63/0263* (2013.01)
USPC .................................................. 726/1; 726/2

(58) Field of Classification Search
CPC ..... G06F 21/604; H04L 63/20; H04L 63/0363
USPC .............. 726/9, 26, 27, 28, 29; 713/224, 201, 713/212, 213, 220, 223; 709/204, 201, 220, 709/227; 389/200, 201, 202, 203, 227
See application file for complete search history.

(56) References Cited

U.S. PATENT DOCUMENTS 6,484,261 B1    11/2002    Wiegel
6,826,698 B1    11/2004    Minkin et al.
(Continued)

FOREIGN PATENT DOCUMENTS

EP        1 710 978 A1    10/2006
WO    WO 03/058450 A1    7/2003

*Primary Examiner* — Jeffrey Pwu
*Assistant Examiner* — Nega Woldemariam
(74) *Attorney, Agent, or Firm* — Oliff PLC (57) ABSTRACT

Provided a computerized system and method of automated auditing a range of rules associated with an enforced security policy. The method comprises automated obtaining log records assigned to a first rule within the range of rules and logged during a counted period, each said log record comprising a unique rule identifier and recorded values of respective arguments comprised in the rule; counting a number of records matching certain recorded values and logged within certain time intervals within the counted period (counted values); and automated generating a counted log record assigned to said rule, said record comprising the unique rule identifier, the counted period, recorded values of the rule arguments and respective counted values. The method further comprises obtaining a plurality of objects engaged in said first rule; resolving a first object among said plurality of objects to a set of resolved values; matching said resolved values to the recorded values of the respective arguments, said recorded values comprised in the counted log record assigned to said rule; counting each match in accordance with respective counted value, thus giving rise to a plurality of matching values of the resolved values; and using the plurality of matching values for analysis related to usage of the first object.

23 Claims, 8 Drawing Sheets

(56) References Cited

U.S. PATENT DOCUMENTS

| | | |
|---|---|---|
| 2002/0169975 A1 | 11/2002 | Good |
| 2003/0061506 A1 | 3/2003 | Cooper et al. |
| 2004/0103315 A1* | 5/2004 | Cooper et al. ............... 713/201 |
| 2005/0138416 A1 | 6/2005 | Qian et al. |
| 2005/0257244 A1 | 11/2005 | Joly et al. |
| 2005/0278790 A1 | 12/2005 | Birk et al. |
| 2006/0075469 A1 | 4/2006 | Vayman |
| 2008/0060071 A1* | 3/2008 | Hennan et al. ............... 726/22 |

* cited by examiner

| Rule # | Rule argument: Source | Rule argument: Destination | Rule argument: Protocol |
|---|---|---|---|
| 1 | Web server (fully used) Database server (obsolete) | Database server (fully used) | SQL (fully used) |
| 2 | Any (partially used) | Web farm (partially used) Application Server (obsolete) | Web services (partially used) |
| 3 | finance network (partially used) | Any (partially used) | p2p (partially used) Web services (partially used) |

Figure 7a

| Rule # | Argument | Object | Can be reduced to | Minimal overlapping object |
|---|---|---|---|---|
| 1 | Source | Database server | None | None |
| 2 | Source | Any | 123.42.40.1<br>19.68.1.60<br>190.18.11.32 | Any |
| 2 | Destination | Web farm | 10.0.0.1-10.0.0.3 | Web servers |
| 2 | Destination | Application server | None | None |
| 3 | Source | Finance network | 10.2.71.1-<br>10.2.71.3 | Finance network |
| 3 | Destination | Any | 1.2.3.4 3.53.44.2<br>42.12.4.111<br>244.234.11.23<br>43.137.235.11 | None |
| 3 | Service | P2P | TCP: 4661;<br>UDP: 4665 | P2P |

Figure 7b

SYSTEM AND METHOD FOR AUDITING A SECURITY POLICY

This application claims the benefit of U.S. Provisional Patent Application No. 60/887,369, titled "System and Method for Auditing a Security Policy" and filed on Jan. 31, 2007, which is hereby incorporated by reference herein.

FIELD OF THE INVENTION

This invention generally relates to managing a security policy for computer systems. More particularly, this invention relates to methods and systems which facilitate auditing an enforced security policy.

BACKGROUND OF THE INVENTION

Today, information security is one of the critical concerns in computer networks and services. One of the strategies for protecting IT infrastructure is implementing network and application security measures aimed to protect networks and respective resources and services from malicious attacks (e.g. theft of data, Denial of Service attacks, unauthorized modification, destruction, misuse, disclosure, etc.). Various methods have been developed for protection of various resources and services; usually these methods include implementation of one or more security policies, combinations and hierarchies thereof. A security policy may be enforced by various devices and/or combinations thereof (e.g. switches, routers, firewalls, VPN devices, network monitoring devices, network and data application servers, etc.).

Nowadays, a security policy may include hundreds of rules related to hundreds and even thousands of objects, such policies are, typically, dynamic and frequently changing. Keeping track of continuously evolving security policies presents an increasing challenge to security departments worldwide. The problem has been recognized in the Prior Art and various systems have been developed to provide a solution, for example:

U.S. Pat. No. 6,484,261 (Wiegel) entitled "Graphical network security policy management" discloses a method of establishing a representation of an abstract network security policy. The representation is established in the form of a decision tree that is constructed by assembling graphical symbols representing policy actions and policy conditions. A user modifies properties of the graphical symbols to create a logical representation of the policy.

U.S. Pat. No. 6,826,698 (Minkin et al.) entitled "System, method and computer program product for rule based network security policies" discloses a system, method and computer program product provided for affording network security features. A plurality of network objects are identified and rule sets associated with one or more of the identified network objects are retrieved. Each rule set includes a plurality of policy rules that govern actions relating to the identified network objects. Overlapping policy rules of the rule sets are reconciled amongst the network objects. The reconciled rule sets are executed. A computer program product and a method are also provided for establishing network security. A plurality of network objects of a network and a plurality of rule sets are provided. The network objects are associated with the rule sets. The rule sets include a plurality of policy rules that govern actions relating to the identified network objects during operation of the network.

US Patent Application No. 2002/0169975 (Good) entitled "Security policy management for network devices" discloses a system and method for use within a computer network that allows for automated provisioning, configuration, and maintenance of the servers and other devices connected to a computer network in accordance with established policies. This system and method make use of templates which represent security polices which are applicable to all devices within the system, a subset of the devices, or a particular type of device.

US Patent Application No. 2005/0278790 (Birk) entitled "System and method for using security levels to simplify security policy management" discloses a system and method for reducing the complexity and improving the performance of enforcing security restrictions on the execution of program code in a runtime environment. In a preferred embodiment, units of executable code, such as methods or functions, are classified by "security level." Code units belonging to a "trusted" security level may call any other code unit in the runtime environment, but other security levels are restricted in the code units they can call. In a preferred embodiment, the security levels are represented by corresponding permission objects. Each permission object that is associated with a particular security level includes a numerical value that denotes that security level. Security policies can be enforced with respect to caller and caller code units by comparing numerical values of corresponding permission objects. This security level scheme also improves runtime performance by making it unnecessary to check individually-defined permissions in many cases.

US Patent Application 2005/0138416 (Quian et al.) entitled "Method for policy-based firewall service management" discloses an object model provided as a general framework for managing network services, such as firewall services. A user or an administrator of a computer may utilize the object model to manage and configure the firewall services. The object model isolates a user and/or an administrator from having to deal with the many possible issues involved in configuring the services. The object model includes two main name spaces: a policy engine platform and a policy object model. The policy engine platform is the central point for interacting with the policy for the services and the kernel components that actually perform the services. The policy object model is used to specify policies that the services support.

US Patent Application No. 2005/0257244 (Berger et al.) entitled "Method and apparatus for role-based security policy management" discloses a method and corresponding tool for security policy management in a network comprising a plurality of hosts and at least one configurable policy enforcement point. The method comprises creating one or more policy templates representing classes of usage control models within the network that are enforceable by configuration of the policy enforcement points; creating one or more policy instances, each based on one of the templates and instantiating the template for identified sets of hosts within the network to which the usage control model is to be applied, deploying the policy instances by generating and providing one- or more configuration files for provisioning corresponding policy enforcement points within the network. Access to the templates and policy instances is controlled so that the policy templates are only modifiable by a first predeterminable user group, the policy instances are only modifiable by the first or a second predeterminable user group and the policy instances are only deployable by a third predeterminable user group.

European Patent Application 1,710,978 (Yang) entitled "Method and apparatus for reducing firewall rules" discloses a method and apparatus for reducing obsolete firewall rules by using existing network routing information as well as firewall rule configuration information to help analyze firewall access logs to identify obsolete and unused firewall rules so that these obsolete firewall rules can be removed.

SUMMARY OF THE INVENTION

In accordance with certain aspects of the present invention, there is provided a computerized method of automated auditing a plurality of rules associated with an enforced security policy and a system thereof. The method comprises obtaining one or more log records assigned to certain rule within a range of rules and logged during a certain time period; counting the number of records matching certain values in certain log fields and logged within certain time intervals within the period; generating a record assigned to said rule, said record comprising the rule identifier, the time interval and respective counters.

In accordance with further aspects of the present invention, the method further comprises obtaining one or more objects engaged in certain fields of a first of said rules; resolving a first object to a set of contained values; matching resolved values to recorded values of the respective fields in the records assigned to said rule; calculating sum of counters in the matching records; using the resulting plurality of matching values for analysis related to usage of one or more objects in one or more fields of the first rule.

In accordance with further aspects of the present invention, the method further includes repeating the operation for all desired objects engaged in the rule and/or for all desired rules.

In accordance with other aspects of the present invention, there is provided a computerized system for automated auditing a range of rules associated with an enforced security policy. The system comprises a log interface configured to obtain log records assigned to certain rule within the range of rules and logged during a counted period, and a processor operatively coupled to the log interface. Each log record comprises a unique rule identifier and recorded values of respective arguments comprised in the rule. The processor is configured to count a number of records matching certain recorded values and logged within certain time intervals within the counted period (the recorded values), and to generate a counted log record assigned to said rule, said record comprising the unique rule identifier, the counted period, recorded values of the rule arguments and respective counted values.

In accordance with further aspects of the present invention, the system further comprises a rule database interface operatively coupled to the processor and configured to obtain a plurality of objects engaged in said rule. The processor is further configured to resolve a first object among said plurality of objects to a set of resolved values; to match said resolved values to the recorded values of the respective arguments, said recorded values comprised in the counted log record assigned to said rule; to count each match in accordance with respective counted value, thus giving rise to a plurality of matching values of the resolved values; and to use the plurality of matching values for analysis related to usage of the first object.

In accordance with other aspects of the present invention, there is provided a computerized method of discovering usage of objects engaged in a range of security rules, each rule comprising one or more argument; the method comprising:
 a) obtaining a plurality of objects engaged in a rule within the range of rules and resolving one or more desired objects among said plurality of objects to respective sets of resolved values;
 b) obtaining log records assigned to said rule and logged during a counted period, each said log record comprising a unique rule identifier and recorded values of respective arguments comprised in the rule;
 c) matching said resolved values to the recorded values of the respective arguments,
 d) counting each match in accordance with a number of log records comprising corresponding matched recorded value and logged within certain time intervals within the counted period, thus giving rise to a plurality of matching values of the resolved values; and
 e) using the plurality of matching values for analysis related to usage of the objects.

In accordance with other aspects of the present invention, there is provided a computerized system capable of discovering usage of objects engaged in a range of security rules, each rule comprising one or more argument. The system comprises processor, a rule database interface operatively coupled to the processor and configured to obtain a plurality of objects engaged in a rule within the range of rules and resolving one or more desired objects among said plurality of objects to respective sets of resolved values; and a log interface operatively coupled to the processor and configured to obtain log records assigned to said rule and logged during a counted period, each said log record comprising a unique rule identifier and recorded values of respective arguments comprised in the rule. The processor is configured to match said resolved values to the recorded values of the respective arguments, to count each match in accordance with a number of log records comprising corresponding matched recorded value and logged within certain time intervals within the counted period, thus giving rise to a plurality of matching values of the resolved values, and to use the plurality of matching values for analysis related to usage of the objects.

Further to all above aspects of the present invention, said analysis may facilitate at least one of the following:
 a) discovering obsolete objects and/or groups thereof;
 b) ranking the objects in accordance with usage;
 c) providing a recommendation for optimizing the object definition;
 d) providing a recommendation for optimizing a group/range and/or other definitions.

Among advantages of certain aspects of the present invention is providing maintainability and manageability of the rules database, reducing vulnerabilities and optimizing performance.

BRIEF DESCRIPTION OF THE DRAWINGS

In order to understand the invention and to see how it may be carried out in practice, an embodiment will now be described, by way of non-limiting example only, with reference to the accompanying drawings, in which.

DETAILED DESCRIPTION OF EXEMPLARY EMBODIMENTS

In the following detailed description, numerous specific details are set forth in order to provide a thorough understanding of the invention. However, it will be understood by those skilled in the art, that the present invention may be practiced without these specific details. In other instances, well-known methods, procedures, components and circuits have not been described in detail so as not to obscure the present invention. In the drawings and descriptions, identical reference numerals indicate those components that are common to different embodiments or configurations.

Unless specifically stated otherwise, as apparent from the following discussions, it is appreciated that throughout the specification discussions utilizing terms such as "processing", "computing", "calculating", "determining", "counting", "generating" or the like, refer to the action and/or processes of a computer or computing system, or processor or similar electronic computing device, that manipulate and/or transform data represented as physical, such as electronic, quantities within the computing system's registers and/or memories into other data, similarly represented as physical quantities within the computing system's memories, registers or other such information storage, transmission or display devices.

The processes/devices presented herein are not inherently related to any particular electronic component or other apparatus, unless specifically stated otherwise. Various general purpose components may be used in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The term "condition" used in this patent specification should be expansively construed to include any compound conditions, including, for example, several conditions and/or their logical combinations.

The term "criterion" used in this patent specification should be expansively construed to include any compound criterion, including, for example, several criteria and/or their logical combinations.

The term "network object" used in this patent specification should be expansively construed to include any network resource and/or group thereof associated with one or more enforced policies and characterized, at least, by a network address. Said network object and/or a group thereof may be associated with a source or destination in one or more certain rules.

The term "service object" used in this patent specification should be expansively construed to include any service and/or group thereof. Said service object or a group thereof may be associated with a protocol, destination port and/or source port in one or more certain rules.

The term "obsolete object" used in this patent specification should be expansively construed to include a network object, service object, or other object engaged in at least one rule associated with one or more enforced policies, wherein said object is not used in association with one or more certain rule arguments (e.g. rule fields), entire certain rule, certain range of rules or combination thereof for certain period of time, directly or as a part of an object group and in accordance with specified logic (e.g. combination, negation, etc.). Accordingly, the object may be obsolete with regards to certain rule argument, certain rule, etc.

The term "rule" used in this patent specification should be expansively construed to include any specification or set thereof comprising one or more rule arguments, a condition (including criterion and logic with regards to the arguments) to be satisfied; and an action which shall be drawn from the rule when the condition is satisfied. In the rules associated with one or more enforced policies the arguments may be selected from a group comprising source, destination, service, protocol, source port, destination port, direction, interface, etc., and be associated with network objects, service objects or other objects where respective rule is applicable (plurality of objects engaged in the rule). The association between the arguments and corresponding objects may be provided in various forms, for example as a table with arguments specified as its fields and associated objects as corresponding values, as a statement with certain syntax, etc. The objects may be referenced by name or other identifier, by certain object definition which may be a part of the rule, etc.

The term "unused object" used in this patent specification should be expansively construed to include any network, service and/or other objects not engaged in at least one rule associated with one or more enforced policies, directly or as a part of an object group.

The references cited in the background teach many principles of security policy implementing and managing that are applicable to the present invention. Therefore the full contents of these publications are incorporated by reference herein where appropriate for appropriate teachings of additional or alternative details, features and/or technical background.

Figure 1:
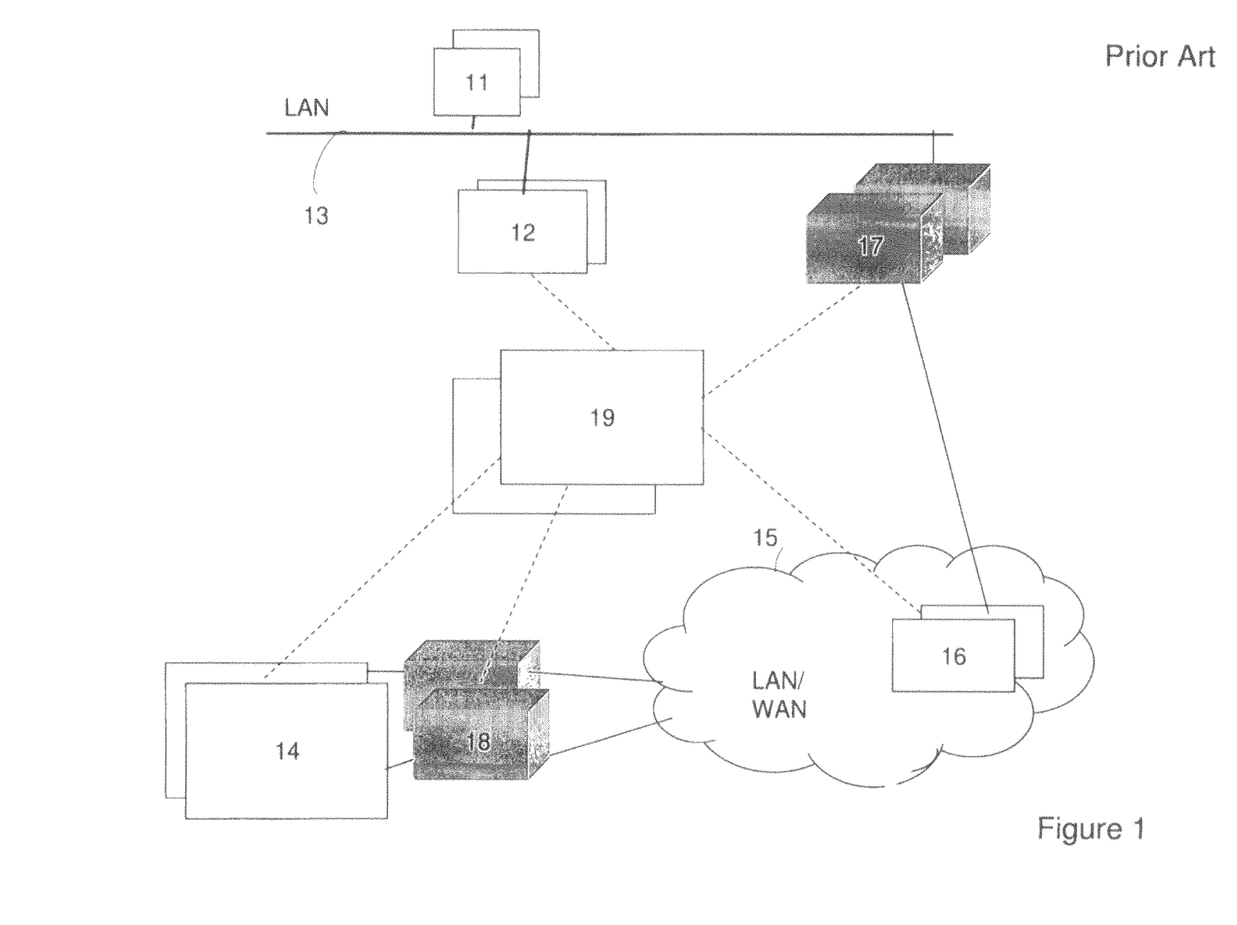
FIG. 1 illustrates a generalized network environment wherein the present invention may be implemented.

Bearing the above in mind, attention is drawn to FIG. 1 schematically illustrating an exemplary network environment wherein the present invention may be implemented. The network environment comprises a plurality of network resources, e.g. workstations 11 and/or servers 12 connected in a private network 13 (e.g. LAN); application server 14 (and/or other not shown remote network resources as, for example, remote hosts, other private or public networks and/or domains thereof, etc.) operatively connected with said private network via a network 15 (e.g. WAN); one or more communication devices 16 (e.g. switches, routers, bridges, etc.) comprised in the network 15 and facilitating the data transfer; a security gateway 17 operatively connecting the private network 13 and the network 14 and controlling inbound and outbound traffic related to the private network; a security gateway 18 operatively connecting the service platforms (and/or other remote network objects) to the network 14 and controlling the respective traffic, etc. The security gateway may comprise, for example, one or more routers or firewalls with respective load balancers, intrusion detection/prevention systems, VPN devices and/or other equipment facilitating network and/or application security. The security gateways operate in accordance with one or more policies (including combinations and/or hierarchies thereof) related to the network resources and/or services.

The network environment may also comprise one or more security managing blocks 19 operatively coupled to one or more network resources and further detailed with reference to FIG. 2. A single security managing block may manage one or more network resources and/or groups thereof. The security managing block may be implemented in one or more standalone servers or be integrated, fully or partly, with one or several network resources (e.g. enterprise switches, network switches, routers, firewalls, other security gateways, etc.).

Note that the invention is not bound by the specific architecture described with reference to FIG. 1. Those versed in the art will readily appreciate that the invention is, likewise, applicable to any network architecture facilitating protection of network resources in accordance with one or more security polices.

Figure 2:
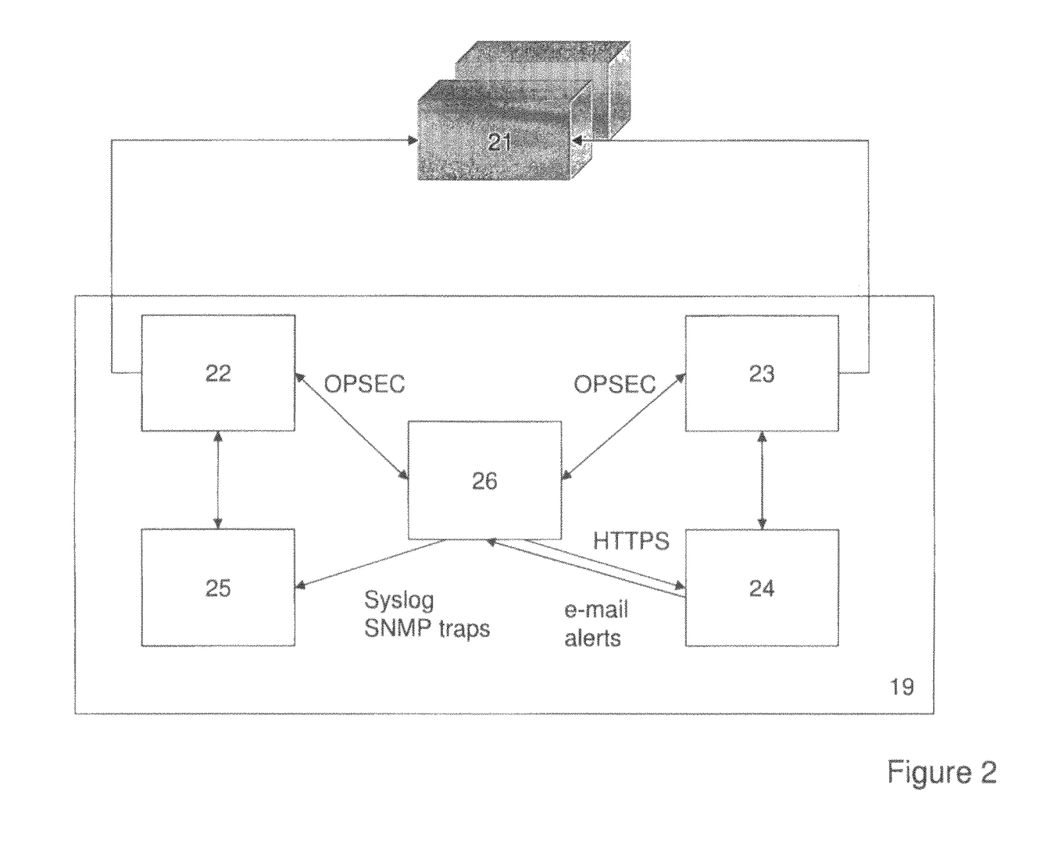
FIG. 2 illustrates a security management block in accordance with certain embodiments of the present invention.

Referring to FIG. 2, there is illustrated the security managing block in accordance with certain embodiments of the present invention.

For purpose of illustration only, the following description is made with respect to the firewall as the security gateway. Those skilled in the art will readily appreciate that the teachings of the present invention are not bound by the firewalls and are applicable in a similar manner to other security gateways operating in accordance with rules corresponding to enforced security policies and capable of tracking rule-related events (e.g. routers, switches, application access control systems, etc.)

A typical firewall system (21) comprises a set of software programs accommodated by one or more hosts, network gateway servers and/or one or more routers/switches and capable of facilitating control over access to network resources by tracking and controlling the communication flow (e.g. access sessions) passing through it. To reach control decisions (e.g., whether to authenticate, accept, reject, drop, encrypt, decrypt, log, perform network address translation (NAT), control Quality of Service (QoS), and/or to provide other actions with regards to a certain access session) the typical firewall obtains, stores, retrieves and manipulates information derived from different communication layers within the communication flow and from other applications. A typical firewall (e.g. Firewall-1 by Check Point, Cisco PIX, Cisco ASA, Juniper Firewall, etc) is capable of accessing and analyzing communication information comprised in different layers of a data packet together with state information derived from previous communications and state information derived from other applications, as well as being capable of manipulating said information.

Control decisions are made in accordance with a security policy. The security policy is defined in terms of the firewalls, networks, subnets and nodes, services, users, resources, applications, etc. and the rules that govern the interactions thereof. Once the security policy is specified, the management module facilitates compilation associated with the security policy rules to be enforced on the firewall systems (e.g. hosts, servers, gateways, routers, switches, etc.). The rules associated with a security policy include security rules (i.e. access-related rules), NAT rules and others. For example, the access-related rules describe access sessions in terms of certain arguments (e.g. source, destination, service, etc.) and specify conditions and actions (e.g. whether the session should be accepted, rejected, authenticated, dropped, encrypted, etc. as well as whether it is to be logged) to be applied to the communication when arguments and/or combinations thereof match the defined values and conditions. Various objects and combinations thereof, e.g. network objects, service objects, users, etc., may be associated with the arguments as values. Typically, packets are matched against source object (i.e. argument "source" with certain network object and/or user and/or group thereof associated as corresponding values), destination object (i.e. argument "destination" with certain network object and/or user and/or group thereof associated as corresponding values) and service object (i.e. argument "service" with certain service object, including protocol and/or port, associated as corresponding values) specified in the rule. Packets may also be matched against additional criteria, for example, inbound and/or outbound interface, authenticated username, application (such as HTTP), etc.

There are various types of network objects including hosts, networks, subnets, ranges, gateways, servers, routers, switches, Internet domains, logical servers, groups thereof, etc. A network object is characterized, at least, by a network address (e.g. IP address). Additional characteristics may include a name, subnet-mask, etc. Some of these characteristics may be specified by the user, while others may be obtained by the firewall from different databases (Network Information Services (NIS/Yellow Pages), Internet domain name service, etc.), from the network objects (e.g. interface and network configuration of hosts, gateways, routers, switches, packet filters and/or alike may be extracted with the help of SNMP agents), etc. Characteristics of service objects include service type specified by used protocol (e.g. IP Protocols: Transmission Control Protocol (TCP), User Datagram Protocol (UDP), Remote Procedure Call (RPC), Internet Control Message Protocol (ICMP), etc.), name and description of service, destination port(s) range, source port range, certain predefined matching string pattern, etc. Service objects can be grouped in families and hierarchies, for example, NFS (the mount program, NFS-server, lock manager), NIS/Yellow Pages (ypserv/ypbind), and NBT (NetBios Name Service, NetBios Datagram Service, NetBios Session Service). The rules may be related to specific characteristics of the service object, e.g. URLs, file names, FTP PUT/GET commands, type of requests, etc.

Objects may be combined in groups and hierarchies. Said combinations may be nested, include logical conditions, e.g. groups with exclusion (as, for example, group A minus group B), negation (as, for example, any object except of), etc. The groups may overlap wherein one or more objects or groups thereof belong to two or more groups. There are also some types of predefined objects, such as, for example, the "Any" object which consists of an entire domain of objects (e.g., all networks, all services, all users etc.).

The rule sets associated with enforced security policies are accommodated in one or more related databases or files (e.g. a rule database, a network object database, a service database, etc) referring hereinafter as a rule set database.

In a typical firewall system, communication attempts can be logged. Events to be logged in accordance with a set of the rules can be recorded in a log database (e.g. one or more log files) and/or exported to third-party systems via standard (e.g., syslog, SNMP) or proprietary methods (e.g., OPSEC). In addition, the log database may comprise records of certain important system events (such as changes of the security policy, security policies being installed or uninstalled on the firewall, etc.). Log recording is triggered by matching certain rule, while the format of the log record(s) is determined by the log configuration specified in the policy and/or respective rule. The typical log record assigned to a rule comprises time and date, an identifier of the respective rule (rule number, ID, rule name and/or the rule definition itself), registered values of respective arguments (e.g. the source and destination addresses of the access session, the name of service attempted, used protocol, source and designation ports, etc.), action taken, log and alert type, user, and the firewall that generated the log entry.

Log records may further comprise derivatives of information related to certain events. For example, some firewalls (e.g., Cisco PIX) provide hit-count data indicating the aggregated number of packets that matched certain rules (access-lists) and certain objects. Such hit-count log records may be accommodated in the log database or in a separate hit-count database.

Referring back to FIG. 2, one or more firewalls (21) are operatively coupled to the security managing block 19 comprising a firewall management module 22. The functions of the firewall management module include providing a backend for the policy editor GUI, monitoring the firewall operation, storing the rule set database (DB) and log DB, reporting, etc. In certain security environments (e.g. multi-domain, multi-policy, etc.) the security management block may comprise a centralized management module 23 (e.g. Provider-1 MDS by Check Point, etc.) operatively coupled with one or more firewalls and, optionally, with the firewall management module. The security management block may also comprise an administrator workstation with a management GUI 24 (e.g., Check Point's SmartDashboard) and/or a security integration module, e.g., a SOC (security operations center) 25 operatively coupled to the firewall management module 22 and/or centralized management module 23.

The rule set database and the log database (or respective parts thereof) may be accommodated in the firewall and/or firewall management module and/or centralized management module.

As proposed in the present invention, the security management block comprises a policy auditor 26 further detailed with reference to FIGS. 3-7. The policy auditor is operatively coupled to the firewall management module and/or centralized management module via standard or proprietary protocols (e.g. OPSEC API, SSH, Telnet, Syslog, SNMP, etc.). Optionally the policy auditor may be operatively coupled to the firewall or any other network and/or management resource accommodating a rule set database (or parts thereof) and/or log records. The policy auditor may be implemented as a standalone platform (e.g. on server-class PC running Redhat Linux) or integrated, fully or partly, with other network and/or management resources (e.g. firewall or other security gateway, firewall management module, security integration module, external log servers, etc.). In accordance with certain embodiments of the present invention, the policy auditor is configured to audit the usage of network objects, service objects or other objects engaged in the rules. The policy auditor may also be capable of tracking changes to the security policy and providing persistent version control, real-time change notification, policy comparison utilities, rule usage analysis, etc.

Figure 3:
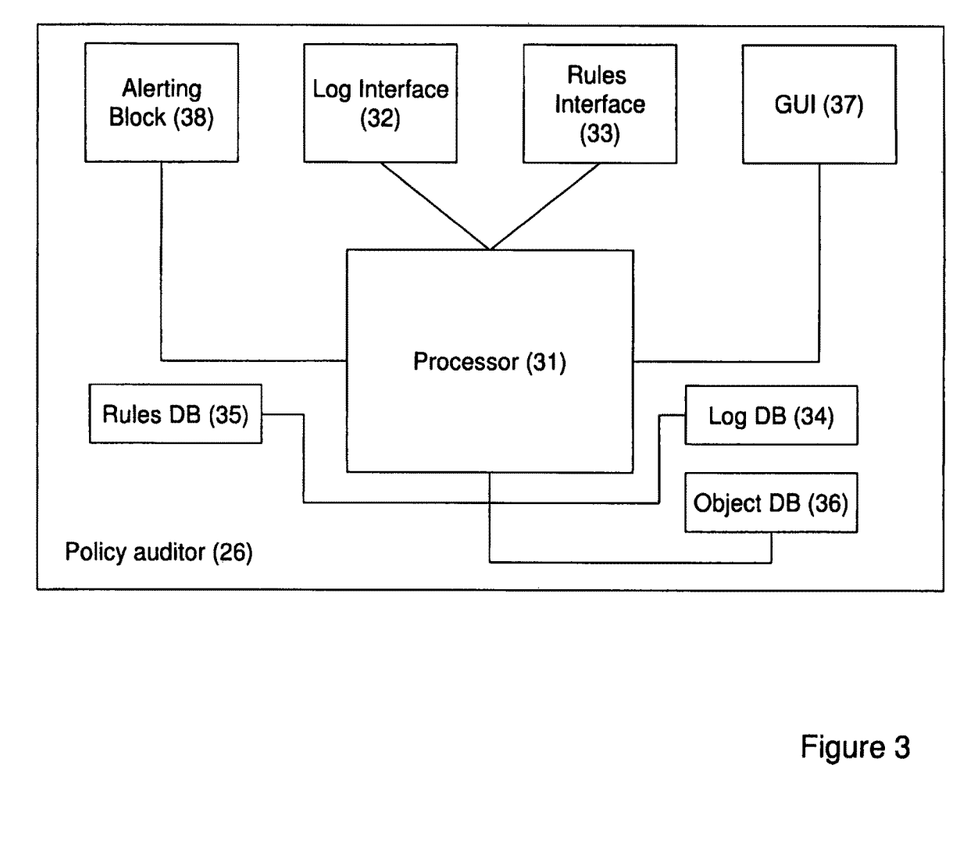
FIG. 3 illustrates a generalized functional block diagram of the policy auditor in accordance with certain embodiments of the present invention.

Referring to FIG. 3, there is illustrated a generalized block diagram of the policy auditor in accordance with certain embodiments of the present invention.

The policy auditor 26 comprises a processor 31 operatively coupled to a log interface 32 and a rule interface 33. The log interface and the rule interface are configured to respectively obtain data from one or more log databases and/or hit-count databases and one or more rule set databases and/or parts thereof and to forward the obtained data to the processor. The connection to said databases may be provided via standard or proprietary protocols (e.g. the OPSEC API, SSH, Telnet, Syslog, SNMP, etc.), as well as via software agents installed at one or more devices accommodating said databases, the agents may be configured to query the DBs and to send the respective data to the interfaces.

The processor 31 is configured to provide necessary processing of the obtained data, to forward the obtained information and/or derivatives thereof for accommodation in one or more data repositories operatively coupled to the processor, and to provide necessary data management. The data repositories include a log repository (34) accommodating information obtained and/or derived from the log records received via the log interface, a rules repository (35) accommodating information obtained via the rule interface and/or derived thereof, and an object repository (36) containing information related to network, service and other objects and characteristics thereof obtained and/or derived by the processor. Said repositories are configured to accommodate historical data and to be automatically updated in a manner enabling reflecting additions, removal and/or modification of the rules and/or objects and relationships thereof in the respective databases.

The processor is further operatively coupled to a user interface block (37) and an alerting and communication block (38). The user interface block is configured to enable one or more users to communicate with the policy auditor (e.g. for administration functions). The alerting and communication block is configured to enable communication with various management systems installed in the user's environment (e.g. SOC systems, IBM Tivoli, HP OpenView, etc), alerting via e-mail, generating Syslog messages and SNMP traps, etc. and/or otherwise notify administrator(s) and/or management system(s) on events related to security policy.

Those skilled in the art will readily appreciate that the invention is not bound by the configuration of FIGS. 1-3; equivalent functionality may be consolidated or divided in another manner. In different embodiments of the invention the blocks and/or parts thereof may be placed in a single or in multiple geographical locations (including duplication for high-availability); operative connections between the blocks and within the blocks may be implemented directly or indirectly, including remote connection. The connection may be provided via Wire-line, Wireless, cable, Internet, Intranet, power, satellite or other networks and/or using any communication standard, system and/or protocol and variants or evolution thereof. The invention may also be practiced in distributed computing environments. The invention may be implemented in a stand-alone form as well as be fully or partly integrated with different devices, including 3rd party equipment.

Those skilled in the art will also readily appreciate that the data repositories may be consolidated or divided in other manner; some of these databases may be shared with other systems, including 3rd party equipment.

Figure 4:
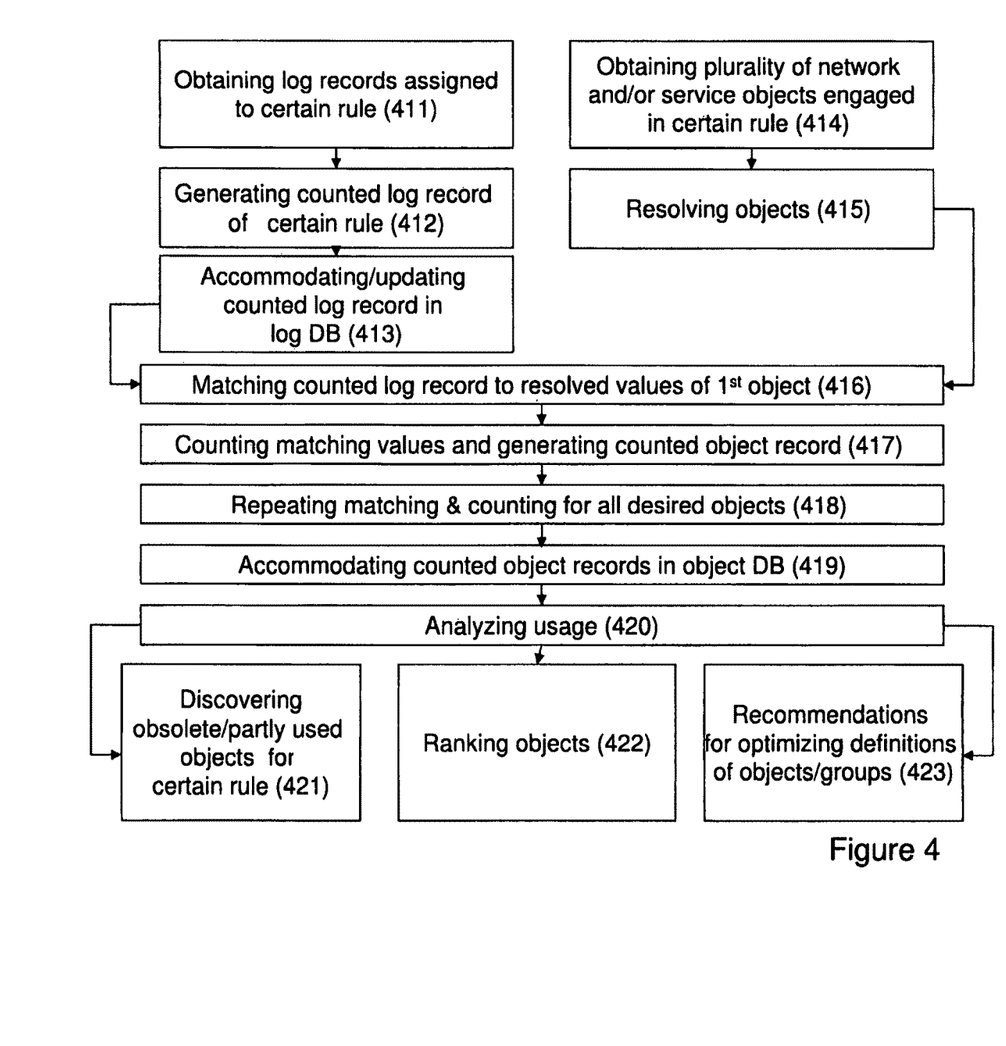
FIG. 4 illustrates a generalized flow diagram of operating the policy auditor in accordance with certain embodiments of the present invention for auditing certain rule.

Attention is drawn to FIG. 4 illustrating a generalized flow diagram of operating the policy auditor in accordance with certain embodiments of the present invention for auditing a certain rule.

As illustrated in FIG. 4, the operation starts with obtaining (411) log records (optionally including hit-count records), said log records assigned to a certain rule. As was detailed with reference to FIG. 2, a log record assigned to certain rule comprises a reference to said rule. This could be a rule number, identifier, name or the textual rule configuration, etc. However, the rules are subject to change on an on-going basis and the rule numbers (or any other kind of reference) may be changed accordingly. As a result, the rule reference number in a log record, being correct at the time of log generation, may incorrectly refer to other rule(s) at later stages. In accordance with certain embodiments of the present invention, the policy auditor is configured to associate a certain rule with numbers (or other references) of said rule in different log records and to facilitate obtaining all log records assigned to a certain rule. Such association may be provided in several ways, some of which are known in the art or detailed in the present invention. For example, the policy auditor may be configured to monitor rule changes, to generate for each rule (or for a certain range of rules) a unique identifier, and to keep association of the unique identifier with the rule number(s) (or other reference) at any (or designated per scheduling) point of time. Some firewalls may be able to maintain unique rule identifiers regardless the changes to rule numbering and to include the identifier in the logs. For such firewalls the policy auditor may be configured to obtain log records assigned to a certain rule in accordance with said unique rule identifier. In certain embodiments of the invention the policy auditor may be configured to obtain and accommodate snapshots of the rule set DB and/or parts thereof, and to compare the current and the last saved snapshots in order to register rule changes. The rule changes may be registered, for example, during scheduled poling of the rule set DB, upon registration of pre-defined logs related to certain events (e.g. save new rule, save new object, etc.), etc.

Obtaining the log records (including, optionally, hit-count records) may be provided substantially in real time when logged, periodically, triggered by predefined or configurable event (e.g. any change of the rule set, certain change of the rule set, administrator's request, etc.).

The policy auditor processes the obtained log records assigned to a certain rule, and counts the number of records matching certain recorded values of arguments and logged within certain, predefined and/or configurable, time intervals (e.g. in resolution of one hour). The set of arguments may be predefined and/or configurable; matching may be performed per certain recorded values of arguments and/or combination thereof and/or values per combination of arguments. In certain embodiments of the invention the set of arguments includes destination, source, and service; and the counting is provided for the recorded values (and/or groups thereof) of said arguments during predefined or configurable counted period. When handling the obtained hit-count records, the processing includes counting the incremental numbers of respective records corresponding to the time intervals (e.g. by periodically sampling the hit-records with the period equal to the time interval).

Upon results of the counting, the policy auditor generates (412) a counted log record assigned to certain rule, said record comprises unique rule identifier, counted period, recorded values of the rule arguments and respective counted values (e.g. the number of records registered during the counted period of time with certain destination addresses, the number of records registered during the counted period of time with a certain range of source addresses; the number of records registered during the counted period of time with certain service protocol, the number of records registered during the counted period of time with certain combination of source address, destination address, and designated port, etc.). In certain embodiments of the invention the information comprised in the counted record may be distributed between several related sub-records as illustrated, by way of non-limiting example, in the following tables 1-1-1-3.

TABLE 1-1

Counted log sub-records related to source.

| Date | Rule ID | Recorded Source Value | Counted value |
|---|---|---|---|
| 2006 Sep. 03 | 1 | 10.0.0.1 | 8 |
| 2006 Sep. 04 | 1 | 10.0.0.1 | 5 |
| 2006 Sep. 05 | 1 | 10.0.0.1 | 7 |
| 2006 Sep. 03 | 2 | 123.42.40.1 | 6 |
| 2006 Sep. 04 | 2 | 19.68.1.60 | 6 |
| 2006 Sep. 05 | 2 | 190.18.11.32 | 9 |

TABLE 1-1-continued

Counted log sub-records related to source.

| Date | Rule ID | Recorded Source Value | Counted value |
|---|---|---|---|
| 2006 Sep. 03 | 3 | 10.2.71.1 | 13 |
| 2006 Sep. 04 | 3 | 10.2.71.2 | 3 |
| 2006 Sep. 05 | 3 | 10.2.71.3 | 14 |

TABLE 1-2

Counted log sub-records related to destination.

| Date | Rule ID | Recorded Destination Value | Counted value |
|---|---|---|---|
| 2006 Sep. 03 | 1 | 10.0.1.2 | 8 |
| 2006 Sep. 04 | 1 | 10.0.1.2 | 5 |
| 2006 Sep. 05 | 1 | 10.0.2.2 | 7 |
| 2006 Sep. 03 | 2 | 10.0.0.1 | 6 |
| 2006 Sep. 04 | 2 | 10.0.0.1 | 2 |
| 2006 Sep. 04 | 2 | 10.0.0.2 | 4 |
| 2006 Sep. 05 | 2 | 10.0.0.3 | 9 |
| 2006 Sep. 03 | 3 | 1.2.3.4 | 5 |
| 2006 Sep. 03 | 3 | 3.53.44.2 | 6 |
| 2006 Sep. 03 | 3 | 42.12.4.111 | 2 |
| 2006 Sep. 04 | 3 | 244.234.11.23 | 3 |
| 2006 Sep. 05 | 3 | 43.137.235.11 | 14 |

TABLE 1-3

Counted log sub-records related to service.

| Date | Rule ID | Recorded Destination Port Value | Recorded IP Protocol Value | Counted value |
|---|---|---|---|---|
| 2006 Sep. 03 | 1 | 1521 | 6 | 8 |
| 2006 Sep. 04 | 1 | 1521 | 6 | 5 |
| 2006 Sep. 05 | 1 | 1521 | 6 | 2 |
| 2006 Sep. 05 | 1 | 1525 | 6 | 2 |
| 2006 Sep. 05 | 1 | 1526 | 6 | 3 |
| 2006 Sep. 03 | 2 | 80 | 6 | 6 |
| 2006 Sep. 04 | 2 | 80 | 6 | 6 |
| 2006 Sep. 05 | 2 | 443 | 6 | 9 |
| 2006 Sep. 03 | 3 | 80 | 6 | 1 |
| 2006 Sep. 03 | 3 | 443 | 6 | 7 |
| 2006 Sep. 03 | 3 | 443 | 6 | 5 |
| 2006 Sep. 04 | 3 | 4661 | 6 | 3 |
| 2006 Sep. 05 | 3 | 4665 | 17 | 14 |

The generated counted log record is accommodated (413) in the log record DB (34). If the log record DB already comprises the counted record assigned to a certain rule, said record will be updated by incrementing counting of the respective values and/or by adding new values corresponding to new value(s) of certain argument(s).

The counted log record may be used for analyzing usage of a certain rule over the counted period of time.

The operating flow also comprises obtaining (414) a plurality of network, service and/or other objects engaged in a certain rule. One or more objects engaged in a certain rule are resolved (415) to their content providing a set of values referring hereinafter as "resolved values". For example, in certain embodiments of the invention the network objects are resolved to a list of IP addresses, and service objects are resolved to a list of combinations of protocol and destination port engaged in the rule. Resolving may be provided in several ways, some of which are known in the art. Non-limiting examples of objects resolved at different points of time are illustrated in the following Tables 2-1-2-3.

In certain embodiments of the present invention, the policy auditor is configured to monitor the object changes in a manner similar to monitoring rule changes, and to keep association of the object (e.g. per object name) with historical and current resolved values and with corresponding rule(s) at any (or designated per scheduling) point of time. The information with regards to plurality of objects engaged in the enforced set of rules may be derived from the rule set DB snapshots (and/or directly from data obtained via the rule interface 33) and accommodated in the object DB (36), including historical resolved values related to a certain object.

TABLE 2-1

Network objects resolved to resolved values.

| Object Name | Snapshot (2006 Sep. 03) Set of resolved values | Snapshot (2006 Sep. 04) Set of resolved values | Snapshot (2006 Sep. 05) Set of resolved values |
|---|---|---|---|
| Web server | 10.0.0.1 | 10.0.0.1 | 10.0.0.1 |
| Application server | — | 10.0.0.10 | 10.0.0.10 |
| Database server | 10.0.1.2 | 10.0.1.2 | 10.0.2.2 |
| Finance network | 10.2.71.0/ 255.255.255.0 | 10.2.71.0/ 255.255.255.0 | 10.2.71.0/ 255.255.255.224 |
| Web farm | — | 10.0.0.1-10.0.0.10 | 10.0.0.1/ 255.255.255.0 |
| Web servers | 10.0.0.1-10.0.0.10 | 10.0.0.1-10.0.0.10 | 10.0.0.1-10.0.0.10 |

TABLE 2-2

Snapshots of service object definitions are different times.

| Object Name | Snapshot (2006 Sepember) Set of resolved values | Snapshot (2006 October) Set of resolved values | Snapshot (2006 November) Set of resolved values |
|---|---|---|---|
| SQL | TCP: 1521 | TCP: 1521, 1525 | TCP: 1521, 1525, 1526 |
| Web services | TCP: 80 | TCP: 80, 443 | TCP: 80, 443 |
| P2P | TCP: 4661 | TCP: 4661-4662 | TCP: 4661-4662, 1214; UDP: 4665 |

Those versed in the art will readily appreciate that obtaining (414) the plurality of network, service and/or other objects and their resolution (415) may be provided independently of operations (411)-(413). Obtaining and/or resolving said plurality of objects may be provided on a scheduled base and/or triggered by certain event (e.g. by administrator request, by auditing certain rule, etc.), etc.

The processor matches (416) the resolved values obtained for a first object among the plurality of the objects engaged in a certain rule to the corresponding recorded values of the rule's arguments, said recorded values comprised in the counted log record assigned to the rule. Each match between the resolved and the recorded values is counted as multiplied by the counted value of the respective recorded value in the counted log record, thus giving rise to a plurality of matching values of the resolved records. Namely, if a resolved value matches a recorded value of a certain argument (e.g. source, destination, etc.), the matching value of said resolved value is equal to the counted value of said recorded value of corresponding argument. The matching value of resolved values having no match in the counted records is equal to zero. The matching value of a group of resolved values (e.g. a range of IP addresses, a group of services a group of certain source address and destination address, etc.) is counted by summarizing the respective matching values of the unique resolved values in the group.

The processor generates (417) a counted object record comprising object identifier (e.g. object name), counting period and matching values corresponding to the resolved values of the object. The results of said matching resolved values (Tables 2-1-2-3) to respective values in the counted log records (Tables 1-1-1.3) are illustrated by way of non-limiting example in the following Tables 3-2-3-4 for the rule set illustrated in Table 3-1.

Matching processing may be started by predefined or configurable events (e.g. obtaining the log records, resolving the objects, obtaining certain log record(s) and/or certain counted log records, obtaining a certain value of a certain argument, administrator's request, etc.), periodically or otherwise scheduled, etc.

TABLE 3-1

Non-limiting example of rule set.

| Rule # | Source | Destination | Service | Action |
|---|---|---|---|---|
| 1 | Web server, Database server | Database server | SQL | Accept |
| 2 | Any | Web farm, Application server | Web services | Accept |
| 3 | Finance network | Any | P2P, Web services | Accept |

TABLE 3-2

Non-limiting example of the counted object sub-record related to source.

| Rule ID | Source | Resolved value(s) | Matching values |
|---|---|---|---|
| 1 | Web server | 10.0.0.1 | 20 |
| 1 | Database server | 10.0.2.2 | 0 |
| 2 | Any | 0.0.0.0-255.255.255.255 | 21 |
| 3 | finance network | 10.2.71.0/ 255.255.255.224 | 30 |

TABLE 3-3

Non-limiting example of the counted object sub-record related to destination.

| Rule ID | Destination | Resolved value(s) | Matching values |
|---|---|---|---|
| 1 | Database server | 10.0.2.2 | 7 |
| 2 | Web farm | 10.0.0.1/ 255.255.255.0 | 21 |
| 2 | Application server | 10.0.0.10 | 0 |
| 3 | Any | 0.0.0.0-255.255.255.255 | 30 |

TABLE 3-4

Non-limiting example of the counted object records related to service.

| Rule ID | Service | Resolved value(s) | Matching values |
|---|---|---|---|
| 1 | SQL | TCP: 1521, 1525, 1526 | 20 |
| 2 | Web services | TCP: 80, 443 | 21 |
| 3 | P2P | TCP: 4661-4662, 1214; UDP: 4665 | 17 |

TABLE 3-4-continued

Non-limiting example of the counted
object records related to service.

| Rule ID | Service | Resolved value(s) | Matching values |
|---------|---------|-------------------|-----------------|
| 3 | Web services | TCP: 80, 443 | 13 |

The operation is repeated (418) for all desired objects engaged in the rule and the resulting counted object records are accommodated (419) in the object DB. As will be further detailed with reference to FIG. 5 and FIG. 7, the counted object records may be further analyzed (420), said analysis may, for example, result in auditing the objects, e.g. discovering (421) obsolete or partially used objects and/or groups thereof, ranking the objects (422) in accordance with usage, providing recommendations for optimizing the object definition (423), etc. The longer the counted period, the more reliable the results are.

Figure 5:
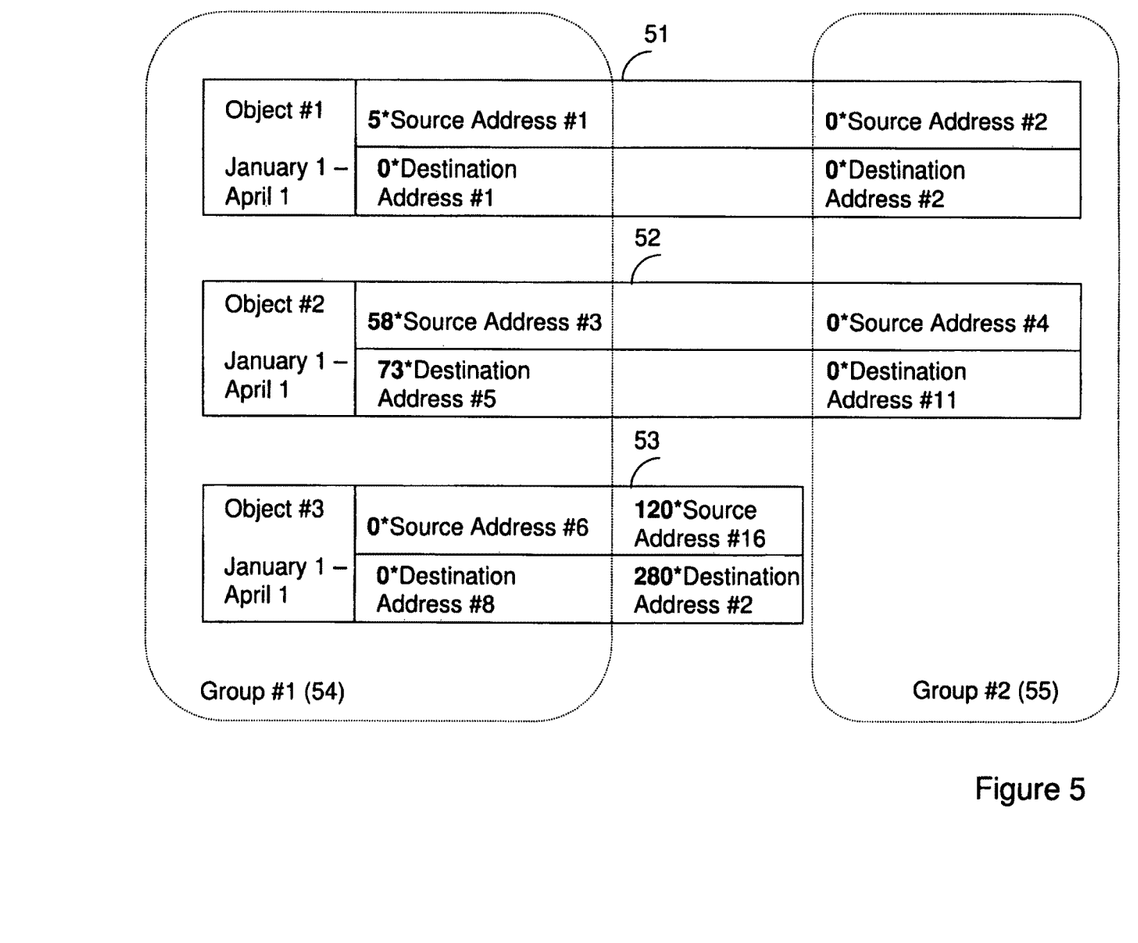
FIG. 5 illustrates exemplified schematic counted records of network objects in accordance with certain embodiments of the present invention.

Referring to FIG. 5, there are illustrated, by way of non-limiting example, schematic counted records of a network object #1 (51), a network object #2 (52) and a network object #3 (53) with counted period from January 1 till April 1, the matching values of the resolved values are illustrated in bold. Some resolved values of the objects are defined as belonging to a group #1 (54), while some other defined as belonging to a group #2 (55) or not belonging to any of said groups. As illustrated in the example, all destination-related matching values comprised in the counted record of the network object #1 are equal to zero; this indicates that said object may be considered obsolete with regards to destination. Similarly, the group #2 may be considered obsolete with regards to the entire rule as all respective matching values are equal to zero. The object #3 is not obsolete as its counted record comprises non-zero values. However, the object is partially used as part of respective matching values is equal to zero. The counted object records may be used for optimization of object/group scope by reducing destination and/or source addresses that were not used for the counted period of time (e.g., the definition of the group #1 may be optimized by excluding the object #3 from the group).

In a similar manner the objects and/or groups thereof may be ranked in accordance with usage (e.g. usage of certain source/destination address, overall usage of the object, etc.).

Following non-limiting example of pseudo code illustrates the operation of obsolete object discovery.

```
GetObsoleteObjects(period, policy)
{
    FOR EACH(rule IN policy)
    {
        objects = GetSourceObjects (rule)
        FOR_EACH(object IN objects)
        {
            members = ResolveObjects (objects)
            object counter = 0
            FOR_EACH(member IN members)
            {
                member_counter =
GetObjectCounters(period, rule, member)
                if(member_counter = 0)
                    PRINT member " of " object " in
source of " rule " is obsolete"
                object_counter += member_counter
            }
            if(object_counter = 0)
                PRINT object " in source of " rule " is
```

```
obsolete"
        }
    }
}
```

Figure 6:
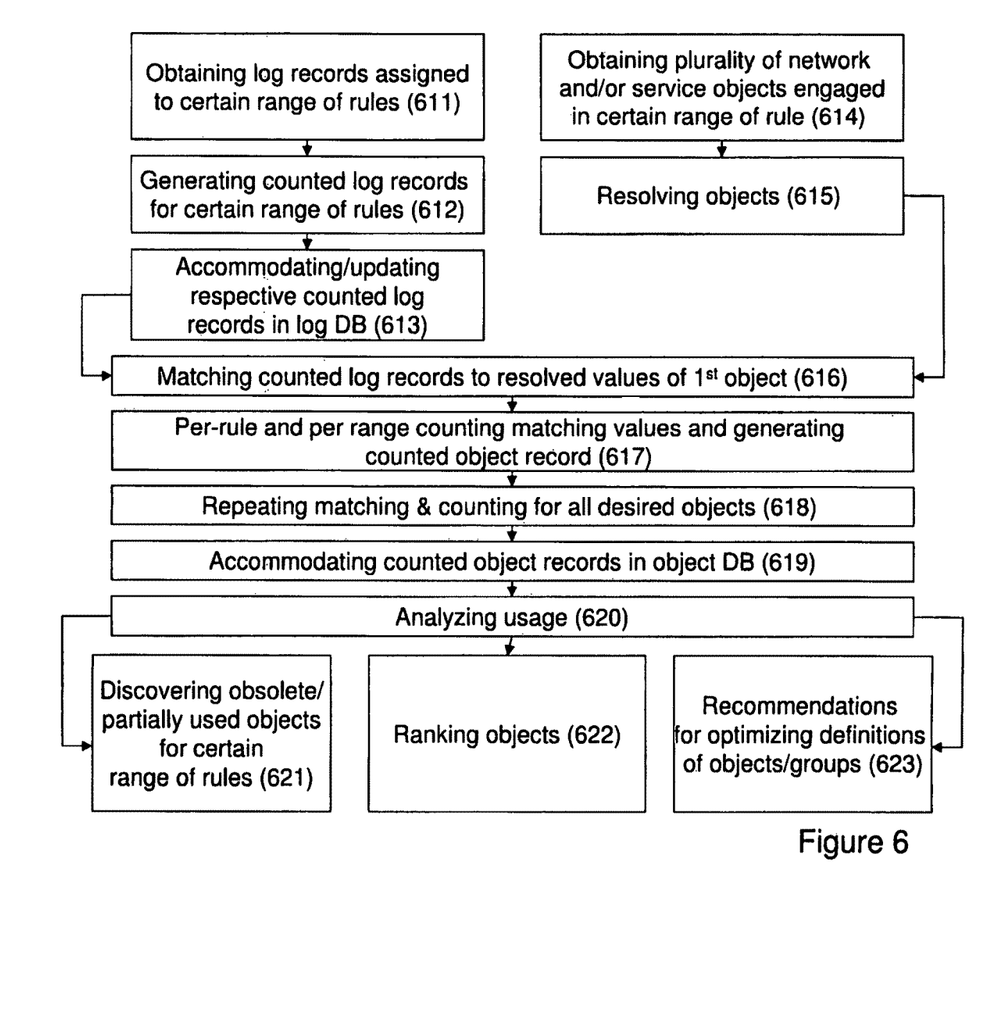
FIG. 6 illustrates a generalized flow diagram of operating the policy auditor in accordance with certain embodiments of the present invention for auditing certain range of rules.

Attention is drawn to FIG. 6, illustrating a generalized flow diagram of operating the policy auditor for auditing a certain range of rules. In accordance with certain embodiments of the present invention the auditing of certain range of rules is provided in a manner similar to the auditing certain rule described with reference to FIG. 4.

As illustrated in FIG. 6, the operation starts with obtaining (611) log records (optionally including hit-count records) of access sessions, said log records assigned to a certain range of rules (e.g. corresponding to a certain interface policy provided in a firewall PIX by Cisco, a certain section in a rule base provided in a Check Point Firewall-1, a certain Zone policy in a Juniper firewall, all rules associated with the enforced security policy, set of rules matching certain criterion, etc.)

The policy auditor processes the obtained log records assigned to a certain, predefined and/or configurable, range of rules, and counts the number of records matching certain, predefined and/or configurable, recorded values of arguments and logged within certain, predefined and/or configurable, time intervals (e.g. in resolution of one hour). Upon results of the counting, the policy auditor generates (612) in a manner similar to described with reference to FIG. 4 a plurality of counted log records, each counted log record assigned to a certain rule among the range of rules. In certain embodiments of the invention the policy auditor may generate an integrated counted record. Said integrated counted record comprises unique identifiers of corresponding rules, counted period and respective counted values of the recorded values integrated over the range of rules (e.g. overall number of records registered during the counted period of time with certain destination address, etc.). The generated plurality of counted log records is accommodated (613) in the log records DB (35).

In certain embodiments of the presented invention said plurality of counted log records may be used for ranking the rules usage, discovering obsolete rules (e.g. certain rule may be considered obsolete if the corresponding number of log records registered during last month is less than certain criterion), for providing recommendations for optimizing the set of rules associated with the enforced policy, for "what-if" analysis of intended rules changes, etc.

The operating flow also comprises obtaining (614) a plurality of network, service and/or other objects engaged in the respective rules within the range. The engaged objects are resolved (615) to their content providing, with regards to each of respective rules, a set of resolved values. In certain embodiments of the invention the resolution may be provided over the entire range of rules. Similar to FIG. 4, obtaining (614) the objects and their resolution (615) may be provided independently of operations (611)-(613).

In certain embodiments of the invention the operating flow may, optionally, comprise discovering objects unused in a certain range of rules (e.g. objects defined in the rule set database and not engaged in any rule within the range). Such objects may be excluded from the following analysis and/or reported to administrator.

The processor calculates (616) matching values of the resolved values obtained for a first object with regards to a counted log record of a first rule, repeats the operation for all desired rules within the rule range, summarizes matching values of equal resolved values in different rules and generates (617) a counted record of the first object, said record comprising object identifier, counting period, resolved values and respective matching values integrated over the rule range.

In certain embodiments of the invention the object counted record may be provided by matching, in a similar manner, the values resolved over the rule range of the first object to the integrated counted log record.

Operations (616) and (617) are repeated (618) for all desired objects engaged in the range of rules. The respective counted object records are accommodated (619) in the object DB followed by analyzing (620) the counted object record(s). The analysis may result in discovering (621) obsolete objects and/or groups thereof over the range of rules and/or in respect to one or more rule arguments or combination thereof; ranking (622) the objects in accordance to usage within the range of rules; providing recommendations for optimizing the object definition (623) (e.g. for limiting exposure by object replacement in rules, for limiting exposure by splitting objects appearing in a single rule into multiple rules, for "what-if" analysis of intended changes, etc.).

It should be noted that the invention is not bound by specific algorithm and/or sequence of operations for generating and analyzing counted object records.

Figure 7A:
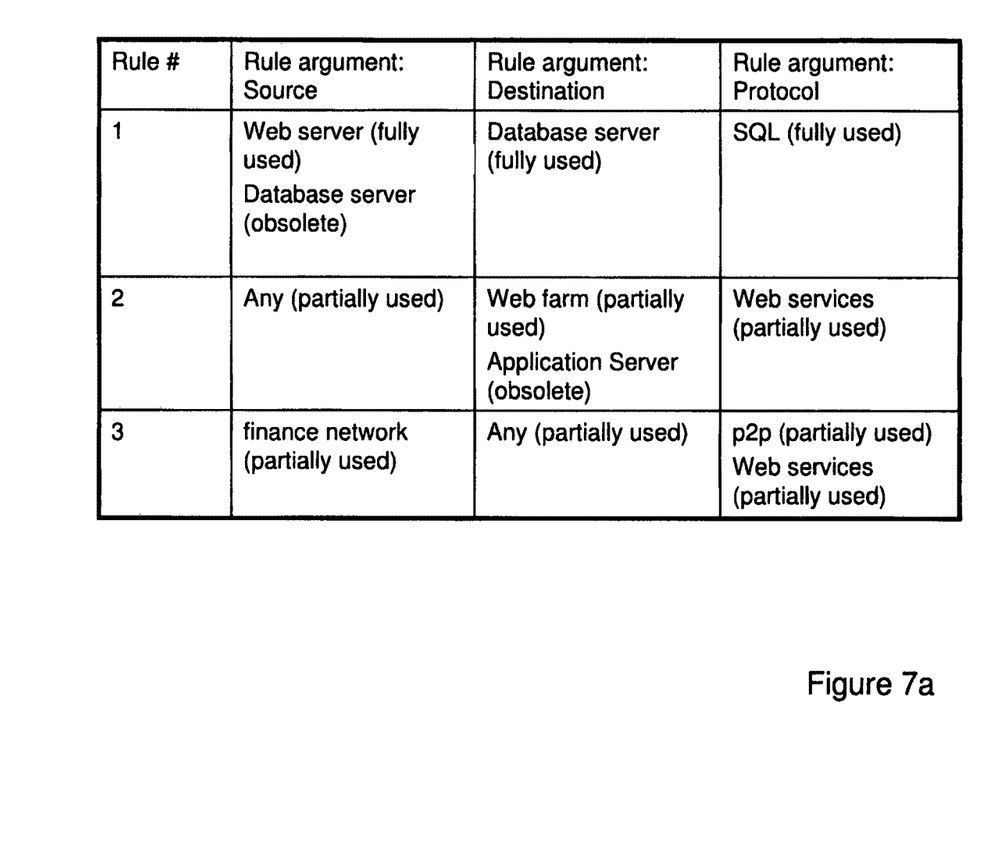
FIGS. 7a and 7b illustrate exemplified reports generated by the policy auditor in accordance with certain embodiments of the present invention.
Figure 7B:
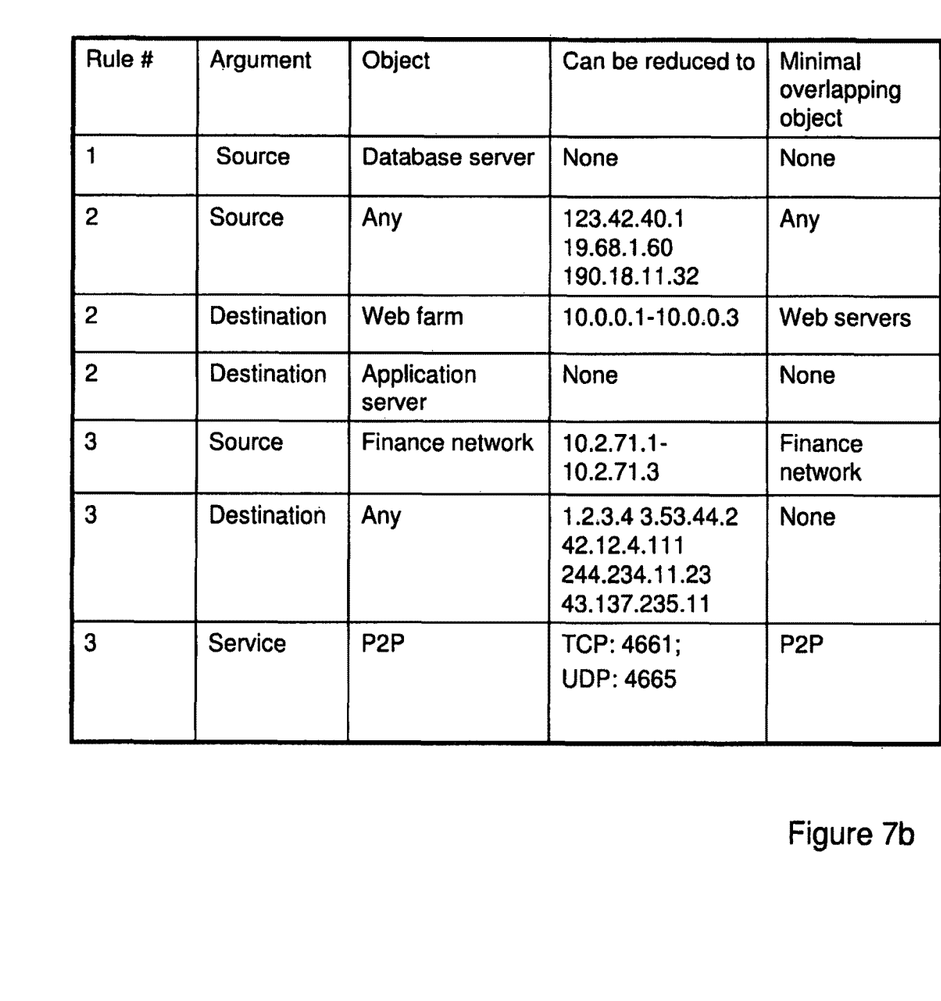

FIGS. 7a and 7b illustrate non-limiting examples of reports generated by the policy auditor in accordance with certain embodiments of the present invention. The report in FIG. 7a illustrates the usage of objects resulting from analysis of matching values illustrated in Tables 3-2, 3-3, 3-4. For example, for the counted period of time (2006-09-03 to 2006-09-05) the object "Database server" is obsolete with regards to "source" argument in rule #1 and in the range of rules #1-3; the object "Application server" is obsolete with regards to "destination" argument in rule #2 and in the range of rules #1-3 as well as with regards to entire rule #2 and the range of rules #1-#3. Matching values related to such objects as Web server as source in rule #1, Database Server as destination in rule #1 and SQL as protocol in rule #1 do not comprise zero values, i.e. the objects are used in full accordance with their definition with regards of respective arguments. The rest of the objects illustrated in FIG. 7a are characterized by a mix of zero and non-zero matching values of resolved values. Accordingly, the definitions of said objects may be amended to exclude unused resolved values (i.e. resolved values with zero matching records). FIG. 7b illustrates recommended amendments of the objects illustrated in FIG. 7a.

It is to be understood that the invention is not limited in its application to the details set forth in the description contained herein or illustrated in the drawings. The invention is capable of other embodiments and of being practiced and carried out in various ways. It should be noted that the invention is not bound by the specific algorithm of processing or specific structure. Those versed in the art will readily appreciate that the invention is, likewise, applicable to any other processing or presentation with equivalent and/or modified functionality which may be consolidated or divided in another manner.

It will also be understood that the invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A computerized method of automated auditing a range of rules associated with an enforced security policy, each rule comprising one or more argument; the method comprising:
   a) automated obtaining log records assigned to at least one rule within the range of rules and logged during a counted period, each said log record comprising a unique rule identifier and recorded values of respective arguments comprised in the rule;
   b) counting a number of records matching certain recorded values of respective arguments comprised in the rule and logged within certain time intervals within the counted period, thus giving rise to counted values corresponding to the recorded values of respective arguments comprised in the rule; and
   c) automated generating a counted log record assigned to said rule, said record comprising the unique rule identifier, the counted period, recorded values of the rule arguments and respective counted values.

2. The method of claim 1 further comprising:
   a) obtaining a plurality of objects engaged in said at least one rule;
   b) resolving a first object among said plurality of objects to a set of resolved values;
   c) matching said resolved values to the recorded values of the respective arguments, said recorded values comprised in the counted log record assigned to said rule;
   d) counting each match in accordance with respective counted value, thus giving rise to a plurality of matching values of the resolved values; and
   e) using the plurality of matching values for analysis related to usage of the first object.

3. The method of claim 2 further comprising repeating the operations b)-e) for all next desired objects among said obtained plurality of the objects engaged in said rule.

4. The method of claim 2 further comprising repeating the operations a)-e) for all next desired rules within said range of rules and summarizing respective matching values before said analysis.

5. The method of claim 2 wherein the objects are selected from a group comprising network objects and service objects.

6. The method of claim 1 wherein the recorded values of respective arguments comprised in certain rule are selected from a group comprising source address, destination address, service protocol, destination port and source port.

7. The method of claim 2 wherein the resolved values are selected from a group comprising source address, destination address, service protocol, destination port and source port.

8. The method of claim 2 wherein said analysis facilitates at least one action selected from a group comprising:
   a) discovering obsolete objects and/or groups thereof;
   b) ranking the objects in accordance with usage;
   c) providing a recommendation for optimizing the object definition;
   d) providing a recommendation for optimizing a group definition.

9. A computerized system capable of auditing a range of rules associated with an enforced security policy, each rule comprising one or more argument; the system comprising:
   a) a log interface configured to obtain log records assigned to a rule within the range of rules and logged during a counted period, each said log record comprising a unique rule identifier and recorded values of respective arguments comprised in the rule; and
   b) a processor operatively coupled to the log interface and configured to i) count a number of records matching certain recorded values of respective arguments comprised in the rule and logged within certain time intervals within the counted period, thus giving rise to counted values corresponding to the recorded values of respective arguments comprised in the rule; and ii) generate a counted log record assigned to said rule, said record comprising the unique rule identifier, the counted period, recorded values of the rule arguments and respective counted values.

10. The system of claim 9 further comprising:
a) a rule database interface operatively coupled to the processor and configured to obtain a plurality of objects engaged in said rule, wherein the processor is further configured to
   i) resolve one or more objects among said plurality of objects to a set of resolved values;
   ii) match said resolved values to the recorded values of the respective arguments, said recorded values comprised in the counted log record assigned to said rule;
   iii) count each match in accordance with respective counted value, thus giving rise to a plurality of matching values of the resolved values; and
   iv) use the plurality of matching values for analysis related to usage of the objects.

11. The system of claim 10 wherein the objects are selected from a group comprising network objects and service objects.

12. The system of claim 10 wherein the recorded values of respective arguments comprised in certain rule are selected from a group comprising source address, destination address, service protocol, destination port and source port.

13. The system of claim 11 wherein the resolved values are selected from a group comprising source address, destination address, service protocol, destination port and source port.

14. The system of claim 11 wherein said analysis facilitates at least one action selected from a group comprising:
a) discovering obsolete objects and/or groups thereof;
b) ranking the objects in accordance with usage;
c) providing a recommendation for optimizing the object definition;
d) providing a recommendation for optimizing a group definition.

15. A computer program comprising computer program code means for performing all the steps of claim 2 when said program is run on a computer.

16. A computer program as claimed in claim 15 embodied on a non-transitory computer readable medium.

17. A computerized method of discovering usage of objects engaged in a range of security rules, each rule comprising one or more argument; the method comprising:
a) obtaining a plurality of objects engaged in a rule within the range of rules and resolving one or more desired objects among said plurality of objects to respective sets of resolved values;
b) obtaining log records assigned to said rule and logged during a counted period, each said log record comprising a unique rule identifier and recorded values of respective arguments comprised in the rule;
c) matching said resolved values to the recorded values of the respective arguments,
d) counting each match in accordance with a number of log records comprising corresponding matched recorded value and logged within certain time intervals within the counted period, thus giving rise to a plurality of matching values of the resolved values; and
e) using the plurality of matching values for analysis related to usage of the objects.

18. The method of claim 17 wherein said analysis facilitates at least one action selected from a group comprising:
a) discovering obsolete objects and/or groups thereof;
b) ranking the objects in accordance with usage;
c) providing a recommendation for optimizing the object definition;
d) providing a recommendation for optimizing a group definition.

19. The method of claim 17 wherein at least one log record comprises a hit counter.

20. The method of claim 17 wherein the range of security rules is associated with a firewall security policy.

21. A computerized system capable of discovering usage of objects engaged in a range of security rules, each rule comprising one or more argument; the system comprising:
a) a rule database interface operatively coupled to a processor and configured to obtain a plurality of objects engaged in a rule within the range of rules and resolving one or more desired objects among said plurality of objects to respective sets, of resolved values;
b) a log interface operatively coupled to the processor and configured to obtain log records assigned to said rule and logged during a counted period, each said log record comprising a unique rule identifier and recorded values of respective arguments comprised in the rule; and
c) the processor configured to
   i) match said resolved values to the recorded values of the respective arguments,
   ii) to count each match in accordance with a number of log records comprising corresponding matched recorded value and logged within certain time intervals within the counted period, thus giving rise to a plurality of matching values of the resolved values, and
   iii) to use the plurality of matching values for analysis related to usage of the objects.

22. The system of claim 21 wherein said analysis facilitates at least one action selected from a group comprising:
a) discovering obsolete objects and/or groups thereof;
b) ranking the objects in accordance with usage;
c) providing a recommendation for optimizing the object definition;
d) providing a recommendation for optimizing a group definition.

23. The method of claim 1 wherein at least one log record comprises a hit counter.

* * * * *